United States Patent
Zheng et al.

(10) Patent No.: US 10,972,021 B2
(45) Date of Patent: Apr. 6, 2021

(54) METHOD AND SYSTEM FOR PROCESSING FAULT INFORMATION OF DECODING CHIP IN ROTARY TRANSFORMER

(71) Applicant: BEIJING ELECTRIC VEHICLE CO., LTD., Beijing (CN)

(72) Inventors: Yi Zheng, Beijing (CN); Yujun Li, Beijing (CN); Shengran Xiao, Beijing (CN); Ronghong Liu, Beijing (CN)

(73) Assignee: BEIJING ELECTRIC VEHICLE CO., LTD., Beijing (CN)

( * ) Notice: Subject to any disclaimer, the term of this patent is extended or adjusted under 35 U.S.C. 154(b) by 148 days.

(21) Appl. No.: 15/774,468

(22) PCT Filed: Oct. 21, 2016

(86) PCT No.: PCT/CN2016/102945
§ 371 (c)(1),
(2) Date: May 8, 2018

(87) PCT Pub. No.: WO2017/166793
PCT Pub. Date: Oct. 5, 2017

(65) Prior Publication Data
US 2020/0259433 A1   Aug. 13, 2020

(30) Foreign Application Priority Data
Apr. 1, 2016 (CN) .......................... 201610203719.4

(51) Int. Cl.
*H02P 6/12* (2006.01)
*H02P 6/17* (2016.01)

(52) U.S. Cl.
CPC . *H02P 6/12* (2013.01); *H02P 6/17* (2016.02)

(58) Field of Classification Search
CPC .......... H02P 6/16; H02P 9/009; H02P 25/026; H02P 8/38
See application file for complete search history.

(56) References Cited

U.S. PATENT DOCUMENTS 7,755,317 B2 * 7/2010 Yu ........................ H02P 29/032
                                                                318/400.04
8,198,841 B2 * 6/2012 Wang ................. G01D 5/24476
                                                                318/400.01
(Continued)

FOREIGN PATENT DOCUMENTS

CN        101197555      6/2008
CN        101997478 A    3/2011
(Continued)

OTHER PUBLICATIONS

International Search Report for PCT/CN2016/102945, dated Jan. 25, 2017.
(Continued)

*Primary Examiner* — Bickey Dhakal
(74) *Attorney, Agent, or Firm* — B. Aaron Schulman, Esq.; Stites & Harbison, PLLC

(57) ABSTRACT

Disclosed are a method and a system for processing fault information of a decoding chip in a rotary transformer. The method includes: reading data information transmitted by the decoding chip according to a preset period; determining whether the data information includes alarm information; when the data information includes the alarm information, estimating a rotor-position value after an alarm occurs in real time according to a rotational speed in the data information obtained before the alarm occurs; determining whether a difference between a current rotor-position value and the estimated rotor-position value is greater than a fault threshold; and when the difference between the current rotor-position value and the estimated rotor-position value is greater than the fault threshold, controlling a motor using the estimated rotor-position value.

16 Claims, 6 Drawing Sheets

(56) References Cited

U.S. PATENT DOCUMENTS

| | | | |
|---|---|---|---|
| 9,413,279 B2* | 8/2016 | Rho | H02P 6/28 |
| 2009/0066281 A1* | 3/2009 | West | H02P 29/032 |
| | | | 318/434 |
| 2012/0062157 A1 | 3/2012 | Ota et al. | |
| 2013/0151042 A1* | 6/2013 | Kim | G01D 5/2449 |
| | | | 701/22 |
| 2015/0188477 A1* | 7/2015 | Shih | H02P 23/14 |
| | | | 318/490 |

FOREIGN PATENT DOCUMENTS

| | | | | |
|---|---|---|---|---|
| CN | 103532451 | | 1/2014 | |
| CN | 103532451 A | * | 1/2014 | |
| CN | 104767450 A | | 7/2015 | |
| CN | 105763128 | | 7/2016 | |
| CN | 105763128 A | * | 7/2016 | H02P 6/16 |

OTHER PUBLICATIONS

Written Opinion of the International Searching Authority for PCT/CN2016/102945, dated Jan. 20, 2017.
Office action from SIPO for CN application 201610203719.4.
English translation of office action from SIPO for CN application 201610203719.4.

* cited by examiner

US 10,972,021 B2

METHOD AND SYSTEM FOR PROCESSING FAULT INFORMATION OF DECODING CHIP IN ROTARY TRANSFORMER

CROSS-REFERENCE TO RELATED APPLICATION

This application a US national phase application of International Application No. PCT/CN2016/102945, filed on Oct. 21, 2016, which claims the priority of China Patent Application No. "201610203719.4" filed on Apr. 1, 2016, the entirety contents of which are incorporated herein by reference.

FIELD

The present disclosure relates to a field of motor controlling technology, and more particularly relates to a method and a system for processing fault information of a decoding chip in a rotary transformer.

BACKGROUND

At present, a rotary transformer is a widely used device for detecting a motor-position. Generally, output signals of the rotary transformer are two orthogonal signals including a sine signal and a cosine signal, and a rotor-position value of the motor is obtained by decoding the two signals. There are two types of decoding methods, one is software decoding. The sine and cosine signals output from the rotary transformer are decoded by designing peripheral circuits and corresponding algorithm programs. The disadvantage of the software decoding is that there are many circuit devices required, and the risk of decoding failure due to the device damage is high. Another decoding method is to use a decoding chip, the advantage is that it is convenient to use and there are many protection functions, the disadvantage is that various protection alarms occur in an actual application. When an alarm occurs, it may be stopped to control the motor, such that the operation reliability of the motor system may be affected.

In addition, in most cases, the alarm of the rotary transformer only has a certain influence on an accuracy of the position detection, and the alarm information may be ignored within an allowable range of the accuracy.

SUMMARY

Embodiments of the present disclosure seek to solve at least one of the above problems existing in the related art to at least some extent. Accordingly, an objective of the present disclosure is to provide a method for processing fault information of a decoding chip in a rotary transformer. With the method, when the decoding chip sends the fault information, it is delayed to report the fault. In addition, by fully considering a safety of operating the motor system, fault-tolerant operation may be allowed, which improves the operation reliability of the motor system.

A second objective of the present disclosure is to provide a system for processing fault information of a decoding chip in a rotary transformer.

In order to achieve the above objectives, embodiments of a first aspect of the present disclosure provide a method for processing fault information of a decoding chip in a rotary transformer. The method includes: reading data information transmitted by the decoding chip according to a preset period; determining whether the data information includes alarm information; when the data information includes the alarm information, estimating a rotor-position value after an alarm occurs in real time according to a rotational speed in the data information obtained before the alarm occurs; determining whether a difference between a current rotor-position value and the estimated rotor-position value is greater than a fault threshold; and when the difference between the current rotor-position value and the estimated rotor-position value is greater than the fault threshold, controlling a motor using the estimated rotor-position value.

In order to achieve the above objectives, embodiments of a second aspect of the present disclosure provide a system for processing fault information of a decoding chip in a rotary transformer. The system includes: a rotary transformer, configured to output orthogonal analog signals; a decoding chip, configured to resolve a rotor-position value and a rotational speed of a motor according to the orthogonal analog signals, and to generate alarm information when the orthogonal analog signals are abnormal; a microprocessor, configured to read data information transmitted by the decoding chip according to a preset period via a serial peripheral interface SPI, to estimate the rotor-position value after an alarm occurs in real time according to the rotational speed in the data information obtained before the alarm occurs when the data information includes the alarm information, and to control the motor using an estimated rotor-position value when a difference between the current rotor-position value and the estimated rotor-position value is greater than a fault threshold.

BRIEF DESCRIPTION OF THE DRAWINGS

Above and/or additional aspects and advantages of embodiments of the present disclosure will become apparent and more readily appreciated from the following descriptions made with reference to the accompanying drawings, in which.

Figure 1:
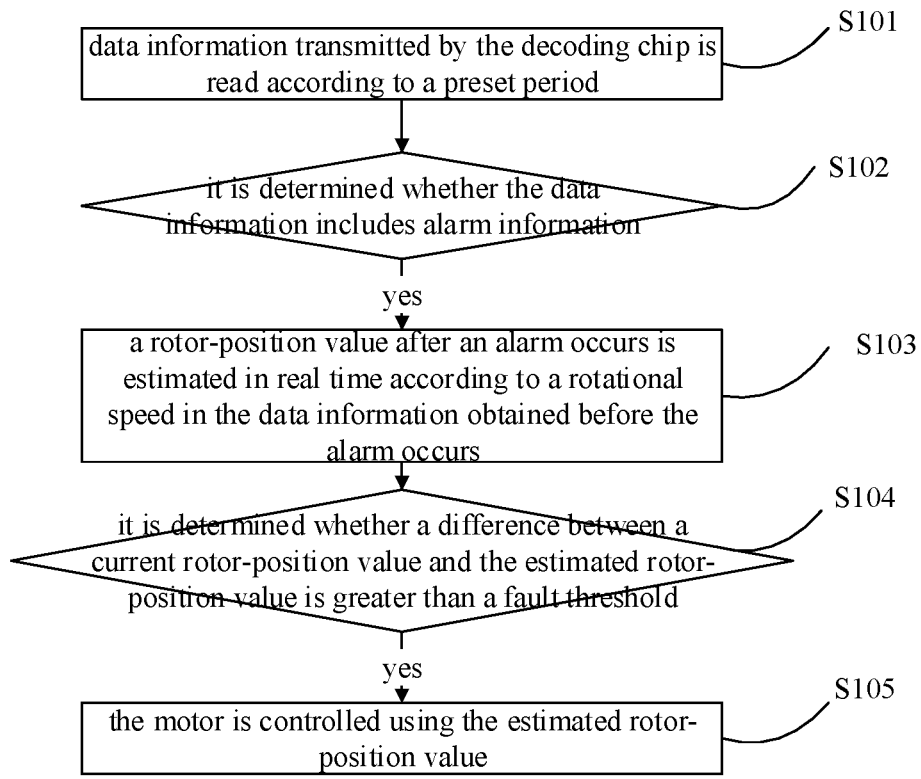
FIG. 1 is a flow chart of a method for processing fault information of a decoding chip in a rotary transformer according to a first embodiment of the present disclosure.

REFERENCE NUMERALS rotary transformer 10, decoding chip 20, microprocessor 30, excitation signal conditioning circuit 40 and feedback signal conditioning circuit 50.

DETAILED DESCRIPTION

Embodiments of the present disclosure are described in detail as follows. Examples of the embodiments are shown in the drawings, where the same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

A method and a system for processing fault information of a decoding chip in a rotary transformer according to embodiments of the present disclosure will be described with reference to drawings.

FIG. 1 is a flow chart of a method for processing fault information of a decoding chip in a rotary transformer according to an embodiment of the present disclosure.

As shown in FIG. 1, the method for processing fault information of a decoding chip in a rotary transformer includes followings.

At block S101, data information transmitted by the decoding chip is read according to a preset period.

The data information transmitted by the decoding chip includes a rotor-position value and a rotational speed of the motor resolved according to orthogonal analog signals output by the rotary transformer.

In an embodiment of the present disclosure, the orthogonal analog signals may include orthogonal sine signal and cosine signal.

At block S102, it is determined whether the data information includes alarm information.

In an embodiment of the present disclosure, when the orthogonal analog signals output by the rotary transformer is abnormal, the decoding chip generates the alarm information. In other words, the data information transmitted by the decoding chip may also include the alarm information.

At block S103, when the data information includes the alarm information, a rotor-position value after an alarm occurs is estimated in real time according to a rotational speed in the data information obtained before the alarm occurs.

Figure 2:
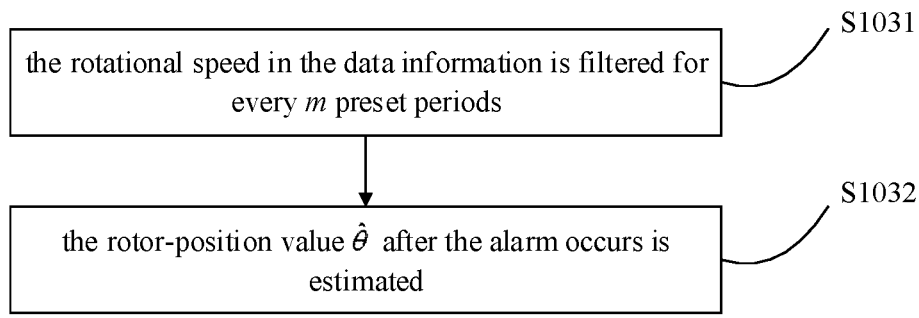
FIG. 2 is a flow chart of act S103 of a method for providing information according to an embodiment of the present disclosure.

In an embodiment of the present disclosure, as shown in FIG. 2, act in block S103 may include followings.

At block S1031, the rotational speed in the data information is filtered for every m preset periods, in which m represents a positive integer.

In an embodiment of the present disclosure, act in block S1031 may include followings.

At block S10311, a primary filtering is performed on the rotational speed.

Specifically, x maximum values and x minimum values are removed from m rotational speeds, and a mean value of m−2*x rotational speeds is computed, in which the mean value is a primary filtered value of the rotational speed, m and x are positive integers, and the value of x is set according to an affecting situation of the motor system. It may be understood that m is greater than 2*x.

At block S10312, a secondary filtering is performed on the rotational speed.

Specifically, the secondary filtering is performed on the rotational speed by the following formula (1) to acquire a secondary filtered value of the rotational speed.

$$Y(n)=\alpha X(n)+Y(n-1) \qquad (1)$$

where, $Y(n)$ represents an $n^{th}$ secondary filtered value of the rotational speed, $X(n)$ represents an $n^{th}$ primary filtered value of the rotational speed, $Y(n-1)$ represents an $(n-1)^{th}$ secondary filtered value of the rotational speed, and $\alpha$ represents a filtering coefficient.

At block S1032, the rotor-position value $\hat{\theta}$ after the alarm occurs is estimated.

Specifically, the rotor-position value $\hat{\theta}$ after the alarm occurs is estimated by the following formula (2).

$$\hat{\theta}=\Theta(nm)+Y(n)*[(m-j)*T] \qquad (2)$$

where, $Y(n)$ represents an $n^{th}$ filtered value of the rotational speed, $\Theta(nm)$ represents the rotor-position value read at an $m^{th}$ time when performing an $n^{th}$ rotational speed filtering, j represents a number of times of the preset periods passed from a time when the $n^{th}$ rotational speed filtering finishes to a time when the alarm occurs, and T represents the preset period.

It may be understood that, $\hat{\theta}$ is the estimated rotor-position value when the rotary transformer provides the alarm information.

At block S104, it is determined whether a difference between a current rotor-position value and the estimated rotor-position value is greater than a fault threshold.

Figure 3:
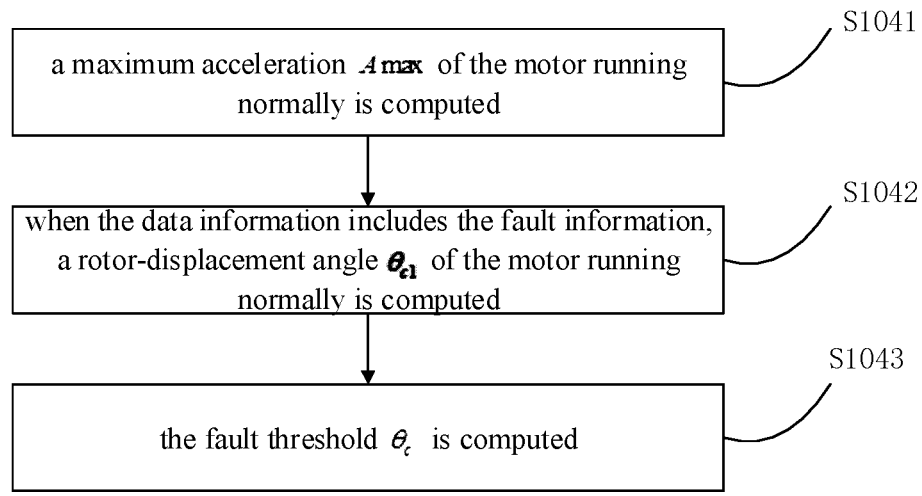
FIG. 3 is a flow chart of act S104 of a method for providing information according to an embodiment of the present disclosure.

In an embodiment of the present disclosure, as shown in FIG. 3, the fault threshold is acquired by performing following acts.

At block S1041, a maximum acceleration Amax of the motor running normally is computed.

Specifically, the maximum acceleration A max is computed by the following formula (3).

$$A\max = \frac{T\max}{J} \qquad (3)$$

where, T max represents a maximum torque of the motor and J represents a rotational inertia of the motor.

In an embodiment of the present disclosure, T max generally represents a maximum breaking torque of the motor. When a mechanical breaking is used, T max represents a sum of a mechanical breaking torque and a motor electromagnetism breaking torque.

It should be noted that, since the motor cannot run normally in a case of motor stalling and galloping, a priority of position detecting failure is lower than that of motor fault operation conditions. Therefore, when the maximum acceleration Amax is computed, the case of motor stalling and galloping is ignored.

At block S1042, when the data information includes the fault information, a rotor-displacement angle $\theta_{c1}$ of the motor running normally is computed by the following formula (4).

$$\theta_{c1}=0.5*A\max*[(m-j)*T]^2 \qquad (4)$$

where, Amax represents a maximum acceleration, j represents a number of times of the preset periods passed from a time when the $n^{th}$ rotational speed filtering finishes to a time when the alarm occurs, and T represents the preset period.

At block S1043, the fault threshold $\theta_c$ is computed.

Specifically, the fault threshold $\theta_c$ is computed by the following formula (5).

$$\theta_c=\min(\theta_{c1},\theta_{c2}) \qquad (5)$$

where, $\theta_{c2}$ represents a maximum error of a rotor-position.

In an embodiment of the present disclosure, a maximum error of a rotor-position $\theta_{c2}$ may be determined according to a requirement of the motor system.

At block S105, when the difference between the current rotor-position value and the estimated rotor-position value is greater than the fault threshold, the motor is controlled using the estimated rotor-position value.

Figure 4:
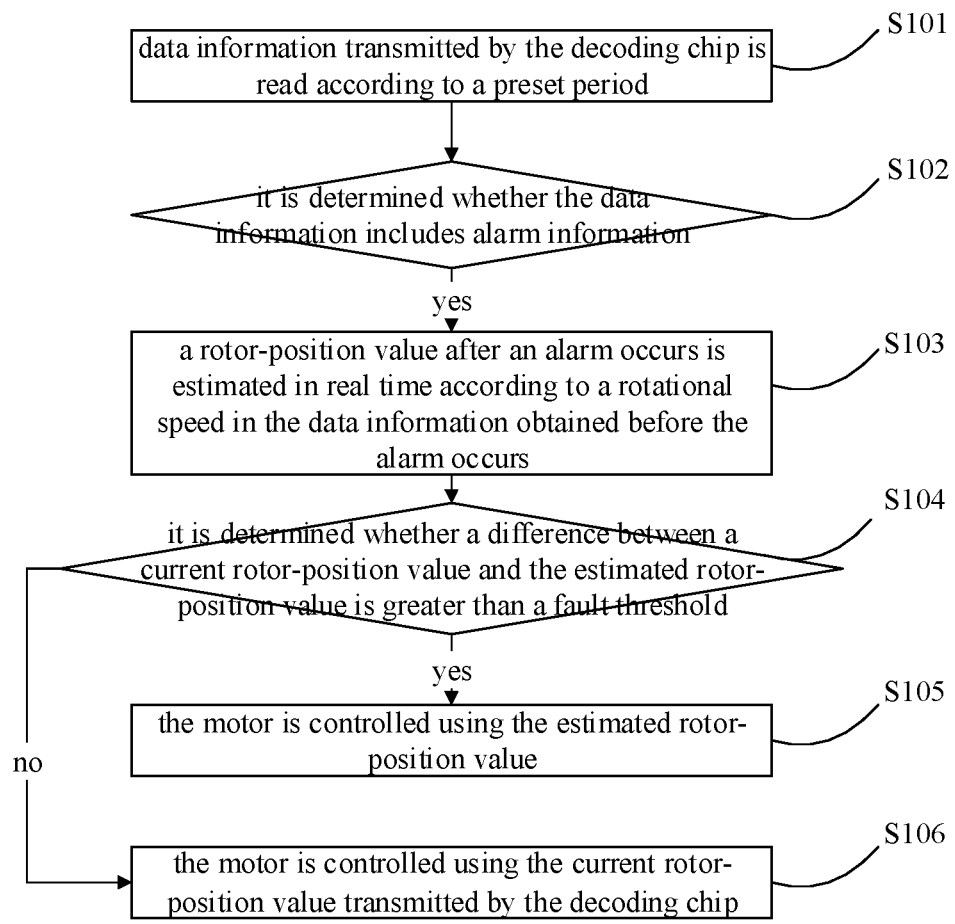
FIGS. 4, 5 and 6 are flow charts of a method for providing information according to embodiments of the present disclosure.

In an embodiment of the present disclosure, as shown in FIG. 4, the method of embodiments of the present disclosure may also include followings.

At block S106, when the difference between the current rotor-position value and the estimated rotor-position value is not greater than the fault threshold, the motor is controlled using the current rotor-position value transmitted by the decoding chip.

Specifically, for the data information transmitted by the decoding chip read at a $j^{th}$ time in an $(n+1)^{th}$ period of filtering the rotational speed, the current rotor-position value is the rotor-position value in the data information.

Figure 5:
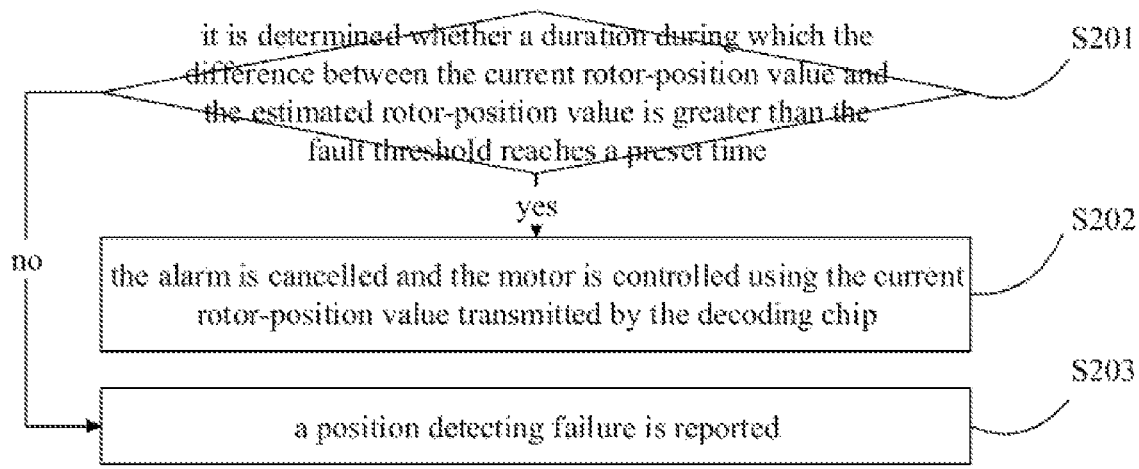

Further, as shown in FIG. 5, after the motor is controlled using the estimated rotor-position value, the method of embodiments of the present disclosure may also include followings.

At block S201, it is determined whether a duration during which the difference between the current rotor-position value and the estimated rotor-position value is greater than the fault threshold reaches a preset time.

At block S202, when the duration does not reach the preset time, the alarm is cancelled and the motor is controlled using the current rotor-position value transmitted by the decoding chip.

At block S203, when the duration reaches the preset time, a position detecting failure is reported.

It should be noted that, in a process of controlling the motor using the estimated rotor-position value, the filtered value Y(n) of the rotational speed configured to estimate the rotor-position value is constant. The rotor-position value is estimated by the above formula (2).

Figure 6:
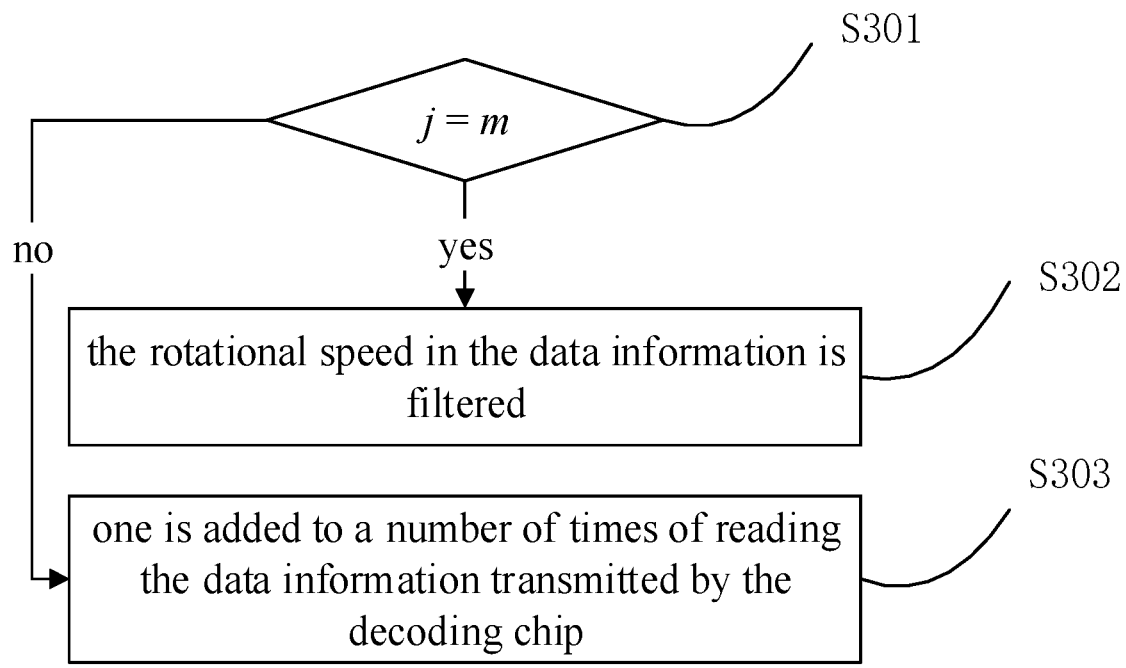

In an embodiment of the present disclosure, as shown in FIG. 6, in a period of filtering the rotational speed, the method of embodiments of the present disclosure may also include followings.

At block S301, it is determined whether j is equal to m.

At block S302, when j is equal to m, the rotational speed in the data information is filtered.

At block S303, when j is not equal to m, one is added to a number of times of reading the data information transmitted by the decoding chip.

For a better understanding of the method for processing fault information of a decoding chip in a rotary transformer of embodiments of the present disclosure, a period among (n+1) periods of filtering the rotational speed of the motor is taken as an example.

Figure 7:
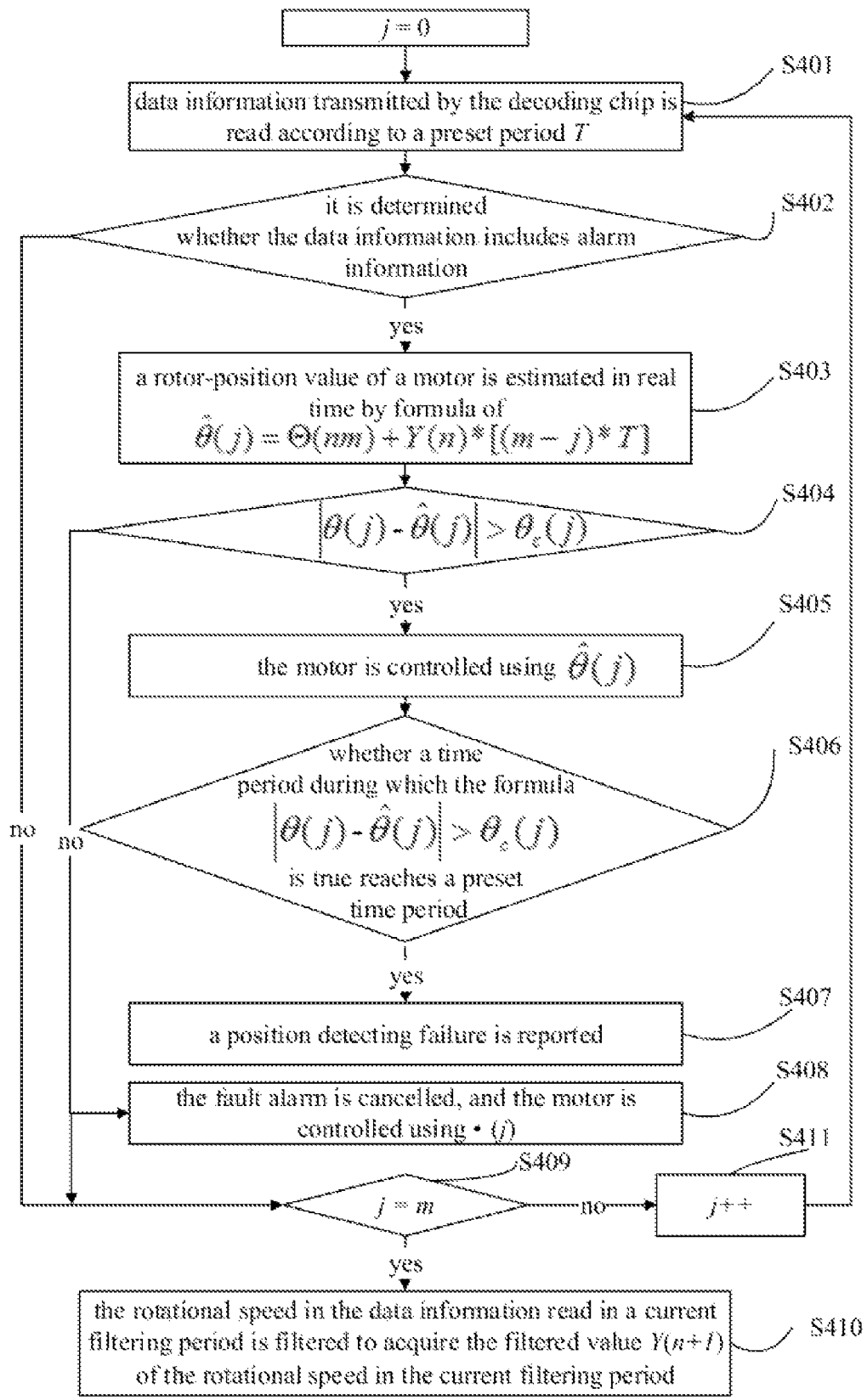
FIG. 7 is a flow chart of a method for providing information according to a specific embodiment of the present disclosure.

Specifically, as shown in FIG. 7, the method includes followings.

At block S401, data information transmitted by the decoding chip is read according to a preset period T.

At block S402, it is determined whether the data information includes alarm information.

At block S403, when the data information includes the alarm information, a rotor-position value of a motor is estimated in real time by formula of $\hat{\theta}(j)=\Theta(nm)+Y(n)*[(m-j)*T]$, where $\hat{\theta}(j)$ represents the rotor-position value after an alarm occurs when the data information transmitted by the decoding chip is read at a $j^{th}$ time, Y(n) represents an $n^{th}$ filtered value of the rotational speed, $\Theta(nm)$ represents the rotor-position value read at an $m^{th}$ time when performing an $n^{th}$ rotational speed filtering, j represents a number of times of the preset periods passed from a time when the $n^{th}$ rotational speed filtering finishes to a time when the alarm occurs, and T represents the preset period.

At block S404, it is determined whether a difference between the rotor-position value transmitted by the decoding chip and the estimated rotor-position value is greater than a fault threshold by a formula of $|\theta(j)-\hat{\theta}(j)|>\theta_c(j)$, where $\theta(j)$ represents the rotor-position value of the motor transmitted by the decoding chip read at a $j^{th}$ time, and $\theta_c(j)$ represents the fault threshold configured to be compared with the difference between the data information transmitted by the decoding chip read at the $j^{th}$ time and the rotor-position value after the alarm occurs when the data information transmitted by the decoding chip is read at the $j^{th}$ time.

At block S405, when the formula $|\theta(j)-\hat{\theta}(j)|>\theta_c(j)$ is true, the motor is controlled using $\hat{\theta}(j)$.

At block S406, it is determined that whether a time period during which the formula $|\theta(j)-\hat{\theta}(j)|>\theta_c(j)$ is true reaches a preset time period.

At block S407, when the time period during which the formula $|\theta(j)-\hat{\theta}(j)|>\theta_c(j)$ is true reaches the preset time period, a position detecting failure is reported.

At block S408, when the formula $|\theta(j)-\hat{\theta}(j)|>\theta_c(j)$ is false, the fault alarm is cancelled, and the motor is controlled using $\theta(j)$.

At block S409, when the data information does not include the alarm information, it is determined whether a number of times of reading the decoding chip is equal to a number m of times for performing the filtering on the rotational speed.

At block S410, when j=m, the rotational speed in the data information read in a current filtering period is filtered to acquire the filtered value Y(n+1) of the rotational speed in the current filtering period.

At block S411, when j<m, the data information transmitted by the decoding chip is read continuously.

It should be noted that, the method for filtering the rotational speed in the method for processing fault information of a decoding chip in a rotary transformer of embodiments of the present disclosure is not limited to the above two rotational speed filtering processes. Moreover, when the rotor-position value is estimated, the estimating method includes but not be limited to the estimating methods described in the above embodiments.

With the method for processing fault information of a decoding chip in a rotary transformer according to embodiments of the present disclosure, the rotor-position value and the rotational speed of the motor which are resolved by the decoding chip are read, the rotor-position value of the motor when the alarm of the decoding chip occurs is estimated according to the rotational speed and the rotor-position value when the motor system runs normally, and the motor is controlled according to a relation of the fault threshold and the difference between the rotor-position value of the motor provided by the decoding chip and the estimated rotor-position value of the motor. Therefore, unnecessary fault alarm is able to be reduced, and the operation reliability of the motor system may be improved.

Figure 8:
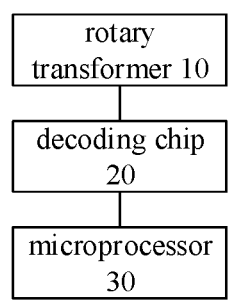
FIG. 8 is a block diagram of a system for providing information according to an embodiment of the present disclosure.

FIG. 8 is a block diagram of a system for providing information according to an embodiment of the present disclosure.

As shown in FIG. 8, the system includes: a rotary transformer 10, a decoding chip 20 and a microprocessor 30.

The rotary transformer 10 is configured to output orthogonal analog signals.

The decoding chip 20 is configured to resolve a rotor-position value and a rotational speed of a motor according to the orthogonal analog signals, and to generate alarm information when the orthogonal analog signals are abnormal.

The microprocessor 30 is configured to read data information transmitted by the decoding chip according to a preset period via an SPI (serial peripheral interface), to estimate the rotor-position value after an alarm occurs in real time according to the rotational speed in the data information obtained before the alarm occurs when the data information includes the alarm information, to control the motor using an estimated rotor-position value when a difference between the current rotor-position value and the estimated rotor-position value is greater than a fault threshold, and to control the motor using the rotor-position value transmitted by the decoding chip when the difference between the current rotor-position value and the estimated rotor-position value is not greater than the fault threshold.

Further, after the microprocessor 30 controls the motor using the estimated rotor-position value, the microprocessor is also configured to: when a duration during which the difference between the current rotor-position value and the estimated rotor-position value is greater than the fault threshold does not reach a preset time, cancel the alarm and control the motor using the current rotor-position value transmitted by the decoding chip; and when the duration during which the difference between the current rotor-position value and the estimated rotor-position value is greater than the fault threshold reaches the preset time, report a position detecting failure.

In an embodiment of the present disclosure, the microprocessor 30 estimates the rotor-position value after the alarm occurs according to the rotational speed in the data information obtained before the alarm occurs by acting of: filtering the rotational speed in the data information for every m preset periods.

Specifically, x maximum values and x minimum values are removed from m rotational speeds, a mean value of the remaining m−2*x rotational speeds is computed, so as to acquire a primary filtered value of the rotational speed, in which m and x are positive integers and m is greater than 2*x; a secondary filtering is performed on the rotational speed to acquire a secondary filtered value of the rotational speed, which is denoted by the following formula (1).

$$Y(n)=\alpha X(n)+Y(n-1) \quad (1)$$

where, $Y(n)$ represents an $n^{th}$ secondary filtered value of the rotational speed, $X(n)$ represents an $n^{th}$ primary filtered value of the rotational speed, $Y(n-1)$ represents an $(n-1)^{th}$ secondary filtered value of the rotational speed, and a represents a filtering coefficient.

The rotor-position value $\hat{\theta}$ after the alarm occurs is estimated by formula (2).

$$\hat{\theta}=\Theta(nm)+Y(n)*[(m-j)*T] \quad (2)$$

where $Y(n)$ represents an $n^{th}$ filtered value of the rotational speed, $\Theta(nm)$ represents the rotor-position value read at an $m^{th}$ time when performing an $n^{th}$ rotational speed filtering, j represents a number of times of the preset periods passed from a time when the $n^{th}$ rotational speed filtering finishes to a time when the alarm occurs, and T represents the preset period.

It may be understood that, $\hat{\theta}$ represents the estimated rotor-position value after the alarm occurs when the decoding chip of the rotary transformer provides the alarm information.

In an embodiment of the present disclosure, the microprocessor 30 also configured to compute a maximum acceleration A max of the motor running normally by formula (3).

$$A\max = \frac{T\max}{J} \quad (3)$$

where T max represents a maximum torque of the motor and J represents a rotational inertia of the motor.

In an embodiment of the present disclosure, T max generally represents a maximum breaking torque of the motor. When a mechanical breaking is used, T max represents a sum of a mechanical breaking torque and a motor electromagnetism breaking torque.

It should be noted that, since the motor cannot run normally in a case of motor stalling and galloping, a priority of position detecting failure is lower than that of motor fault operation conditions. Therefore, when the maximum acceleration A max is computed, the case of motor stalling and galloping is ignored.

When the data information includes the fault information, a rotor-displacement angle $\theta_{c1}$ of the motor running normally by formula (4).

$$\theta_{c1}=0.5*A\max*[(m-j)*T]^2 \quad (4)$$

where A max represents a maximum acceleration, j represents a number of times of the preset periods passed from a time when the $n^{th}$ rotational speed filtering finishes to a time when the alarm occurs, and T represents a preset period.

The fault threshold $\theta_c$ is computed by formula (5).

$$\theta_c=\min(\theta_{c1},\theta_{c2}) \quad (5)$$

where $\theta_{c2}$ represents a maximum error of a rotor-position.

In an embodiment of the present disclosure, a maximum error of a rotor-position $\theta_{C2}$ may be determined according to a requirement of the motor system.

In an embodiment of the present disclosure, in a period of filtering the rotational speed, the microprocessor 30 is also configured to: filter the rotational speed in the data information when j is equal to m; add one to a number of times of reading the data information transmitted by the decoding chip when j is not equal to m.

In an embodiment of the present disclosure, the decoding chip 20 is also configured to output a high-frequency sine excitation signal.

Figure 9:
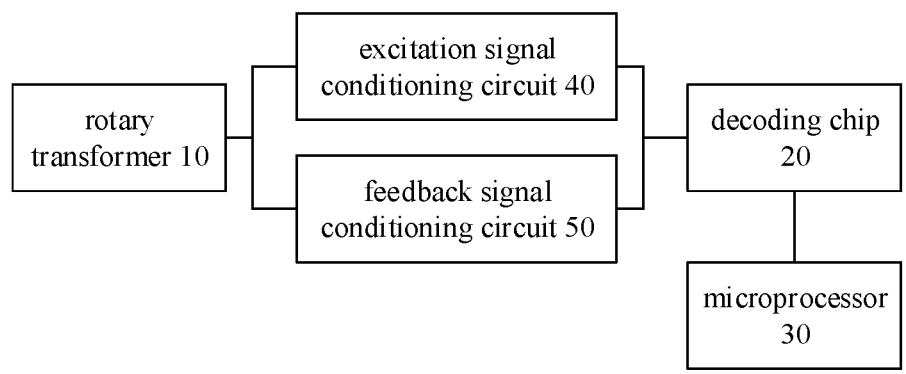
FIG. 9 is a block diagram of a system for providing information according to another embodiment of the present disclosure.

Further, as shown in FIG. 9, the above system also includes: an excitation signal conditioning circuit 40 and a feedback signal conditioning circuit 50.

Specifically, the excitation signal conditioning circuit 40 is configured to send the high-frequency sine excitation signal to the rotary transformer 10, such that the rotary transformer 10 feeds back the orthogonal analog signals. The feedback signal conditioning circuit 50 is configured to send the orthogonal analog signals to the decoding chip 20.

The orthogonal analog signals include a sine signal and a cosine signal.

It should be noted that, when the microprocessor 30 in the system for processing fault information of a decoding chip in a rotary transformer according to embodiments of the present disclosure filters the rotational speed, the used method for filtering the rotational speed is not limited to the above two rotational speed filtering processes. Moreover, when the rotor-position value is estimated, the estimating method includes but not be limited to the estimating methods described in the above embodiments.

With the system for processing fault information of a decoding chip in a rotary transformer according to embodiments of the present disclosure, the decoding chip resolves the rotor-position value and the rotational speed of the motor, when the decoding chip generates the alarm information, the microprocessor estimates the rotor-position value of the motor when the alarm of the decoding chip occurs according to the rotational speed and the rotor-position value when the motor system runs normally, and the motor is controlled according to a relation of the fault threshold and the difference between the rotor-position value of the motor provided by the decoding chip and the estimated rotor-position value of the motor. Therefore, unnecessary fault alarm is able to be reduced, and the operation reliability of the motor system may be improved.

In the description of the present disclosure, it should be understood that, orientations or positional relations indicated by terms such as "central", "longitudinal", "lateral", "length", "width", "thickness", "above", "below", "front", "rear", "left", "right", "vertical", "horizontal", "top", "bottom" "inner", "outer", "lower", "clockwise", "counterclockwise", "axial", "radial", "circumferential" the like are orientations or positional relations illustrated based on the drawings, which are for convenience of describing the present invention and simplify the description, rather than indicating or implying the pointed device or element must having a particular orientation, being constructed and operated in a particular orientation, and therefore should not be construed to limit the present disclosure.

In addition, terms such as "first" and "second" are used for purposes of description and are not intended to indicate or imply relative importance or significance or to imply the number of indicated technical features. Thus, the feature defined with "first" and "second" may comprise one or more of this feature. In the description of the present disclosure, "a plurality of" means at least two such as two, three and the like, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, unless specified otherwise. Specific meanings of above terms in the present disclosure can be understood by those skilled in the art according to specific situations.

In the present disclosure, unless specified or limited otherwise, a structure in which a first feature is "on" or "below" a second feature may refer to the first feature and the second feature being direct contacted or being indirect contacted via an intermediary medium with each other. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the description of the present specification, reference terms such as "one embodiment", "some embodiments," "an example", "a specific example" or "some examples" means that a particular feature, structure, material, or characteristic described in connection with the embodiment or example is included in at least one embodiment or example of the present disclosure. In this specification, exemplary expression of the above terms is not necessary to refer to a same embodiment or example. Moreover, the described particular features, structures, materials, or characteristics may be combined in any suitable manner in any one or more embodiments or examples. Furthermore, those skilled in the art may integrate and combine the different embodiments or examples described in this specification and features of different embodiments or examples without conflicting with each other.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for processing fault information of a decoding chip in a rotary transformer, comprising:
    reading data information transmitted by the decoding chip for preset periods;
    determining whether the data information comprises alarm information;
    performing a primary filtering on rotational speeds in the data information for the preset periods obtained before an alarm occurs to obtain a primary filtered value, performing a secondary filtering on the primary filtered value to obtain a secondary filtered value, and when the data information comprises the alarm information, estimating a rotor-position value after the alarm occurs in real time at least according to the secondary filtered value and a number of times the preset periods passed from a time when the secondary filtering finishes to a time when the alarm occurs;
    determining a fault threshold according to a rotor-displacement angle of a motor running normally when the data information comprises the fault information and a maximum error of a rotor-position;
    determining whether a difference between a current rotor-position value and the estimated rotor-position value is greater than the fault threshold; and
    when the difference between the current rotor-position value and the estimated rotor-position value is greater than the fault threshold, controlling a motor using the estimated rotor-position value.

2. The method according to claim 1, wherein after the motor is controlled using the estimated rotor-position value, the method further comprises:
    determining whether a duration during which the difference between the current rotor-position value and the estimated rotor-position value is greater than the fault threshold reaches a preset time;
    when the duration does not reach the preset time, cancelling the alarm and controlling the motor using the current rotor-position value transmitted by the decoding chip; and
    when the duration reaches the preset time, reporting a position detecting failure.

3. The method according to claim 1, wherein estimating the rotor-position value after the alarm occurs in real time according to the rotational speed in the data information obtained before the alarm occurs comprises:
    estimating the rotor-position value $\hat{\theta}$ after the alarm occurs by a formula of:

$$\hat{\theta} = \Theta(nm) + Y(n)*[(m-j)*T],$$

where, $Y(n)$ represents an $n^{th}$ filtered value of the rotational speed, $\Theta(nm)$ represents the rotor-position value read at an $m^{th}$ time when performing an $n^{th}$ rotational speed filtering, j represents a number of times of the preset periods passed from a time when the $n^{th}$ rotational speed filtering finishes to a time when the alarm occurs, and T represents the preset period.

4. The method according to claim 3, wherein filtering the rotational speed in the data information for every m preset periods comprises:
removing x maximum values and x minimum values from m rotational speeds, computing a mean value of m−2*x rotational speeds, so as to acquire a primary filtered value of the rotational speed, in which m and x are positive integers and m is greater than 2*x;
performing a secondary filtering on the rotational speed to acquire a secondary filtered value of the rotational speed, which is denoted by a formula of:

$Y(n)=\alpha X(n)+Y(n-1)$, where, $Y(n)$ represents an $n^{th}$ secondary filtered value of the rotational speed, $X(n)$ represents an $n^{th}$ primary filtered value of the rotational speed, $Y(n-1)$ represents an $(n-1)^{th}$ secondary filtered value of the rotational speed, and a represents a filtering coefficient.

5. The method according to claim 3, wherein determining the fault threshold comprises:
computing a maximum acceleration Amax of the motor running normally, wherein the maximum acceleration Amax is computed by a formula of:

$$A\max = \frac{T\max}{J},$$

where, Tmax represents a maximum torque of the motor and J represents a rotational inertia of the motor;
when the data information comprises the fault information, computing the rotor-displacement angle $\theta_{c1}$ of the motor running normally by a formula of:

$\theta_{c1}=0.5*A\max*[(m-j)*T]^2$, where, j represents a number of times of the preset periods passed from a time when the $n^{th}$ rotational speed filtering finishes to a time when the alarm occurs;
computing the fault threshold $\theta_c$ by a formula of:

$\theta_c=\min(\theta_{c1},\theta_{c2})$, where, $\theta_{c2}$ represents the maximum error of the rotor-position.

6. The method according to claim 5, wherein in a period of filtering the rotational speed, the method further comprises:
determining whether j equals to m;
when j is equal to m, filtering the rotational speed in the data information;
when j is not equal to m, adding one to a number of times of reading the data information transmitted by the decoding chip.

7. The method according to claim 1, further comprising:
when the difference between the current rotor-position value and the estimated rotor-position value is not greater than the fault threshold, controlling the motor using the current rotor-position value transmitted by the decoding chip.

8. A system for processing fault information of a decoding chip in a rotary transformer, comprising:
a rotary transformer, configured to output orthogonal analog signals;
a decoding chip, configured to resolve a rotor-position value and a rotational speed of a motor according to the orthogonal analog signals, and to generate alarm information when the orthogonal analog signals are abnormal;
a microprocessor, configured to read data information transmitted by the decoding chip for preset periods via a serial peripheral interface SPI, to perform a primary filtering on rotational speeds in the data information for the preset periods obtained before an alarm occurs to obtain a primary filtered value, performing a secondary filtering on the primary filtered value to obtain a secondary filtered value, and when the data information comprises the alarm information, to estimate the rotor-position value after the alarm occurs in real time at least according to the secondary filtered value and a number of times the preset periods passed from a time when the secondary filtering finishes to a time when the alarm occurs, and to control the motor using an estimated rotor-position value when a difference between the current rotor-position value and the estimated rotor-position value is greater than a fault threshold, wherein the fault threshold is determined according to a rotor-displacement angle of a motor running normally when the data information comprises the fault information and a maximum error of a rotor-position.

9. The system according to claim 8, wherein the decoding chip is further configured to output a high-frequency sine excitation signal.

10. The system according to claim 9, further comprises:
an excitation signal conditioning circuit, configured to send the high-frequency sine excitation signal to the rotary transformer, such that the rotary transformer feeds back the orthogonal analog signals, wherein the orthogonal analog signals comprise a sine signal and a cosine signal; and
a feedback signal conditioning circuit, configured to send the orthogonal analog signals to the decoding chip.

11. The system according to claim 8, wherein after the microprocessor controls the motor using the estimated rotor-position value, the microprocessor is further configured to:
when a duration during which the difference between the current rotor-position value and the estimated rotor-position value is greater than the fault threshold does not reach a preset time, cancel the alarm and control the motor using the current rotor-position value transmitted by the decoding chip; and
when the duration during which the difference between the current rotor-position value and the estimated rotor-position value is greater than the fault threshold reaches the preset time, report a position detecting failure.

12. The system according to claim 8, wherein the microprocessor estimates the rotor-position value after the alarm occurs according to the rotational speed in the data information obtained before the alarm occurs by acting of:
estimating the rotor-position value $\hat{\theta}$ after the alarm occurs by a formula of:

$\hat{\theta}=\Theta(nm)+Y(n)*[(m-j)*T]$, where, $Y(n)$ represents an $n^{th}$ filtered value of the rotational speed, $\Theta(nm)$ represents the rotor-position value read at an $m^{th}$ time when performing an $n^{th}$ rotational speed filtering, j represents a number of times of the preset periods passed from a time when the $n^{th}$ rotational speed filtering finishes to a time when the alarm occurs, and T represents the preset period.

13. The system according to claim 12, wherein filtering the rotational speed in the data information for every m preset periods comprises:
removing x maximum values and x minimum values from m rotational speeds, computing a mean value of m−2*x rotational speeds, so as to acquire a primary filtered value of the rotational speed, in which m and x are positive integers and m is greater than 2*x;

performing a secondary filtering on the rotational speed to acquire a secondary filtered value of the rotational speed, which is denoted by a formula of:

$Y(n)=\alpha X(n)+Y(n-1)$, where, $Y(n)$ represents an $n^{th}$ secondary filtered value of the rotational speed, $X(n)$ represents an $n^{th}$ primary filtered value of the rotational speed, $Y(n-1)$ represents an $(n-1)^{th}$ secondary filtered value of the rotational speed, and $\alpha$ represents a filtering coefficient.

14. The system according to claim 12, wherein the microprocessor is further configured to:

compute a maximum acceleration Amax of the motor running normally, in which the maximum acceleration Amax is computed by a formula of:

$$A\max = \frac{T\max}{J},$$

where, Tmax represents a maximum torque of the motor and J represents a rotational inertia of the motor;

when the data information comprises the fault information, compute the rotor-displacement angle $\theta_{c1}$ of the motor running normally by a formula of:

$\theta_{c1}=0.5*A \max*[(m-j)*T]^2$, where, j represents a number of times of the preset periods passed from a time when the $n^{th}$ rotational speed filtering finishes to a time when the alarm occurs;

compute the fault threshold $\theta_c$, by a formula of:

$\theta_c=\min(\theta_{c1},\theta_{c2})$, where, $\theta_{C2}$ represents the maximum error of the rotor-position.

15. The system according to claim 12, wherein in a period of filtering the rotational speed, the microprocessor is further configured to:

filter the rotational speed in the data information when j is equal to m;

add one to a number of times of reading the data information transmitted by the decoding chip when j is not equal to m.

16. The system according to claim 8, wherein when the difference between the current rotor-position value and the estimated rotor-position value is not greater than the fault threshold, the microprocessor is further configured to control the motor using the current rotor-position value transmitted by the decoding chip.

* * * * *